United States Patent [19]

Saito et al.

[11] Patent Number: 4,891,697
[45] Date of Patent: Jan. 2, 1990

[54] ELECTRONIC ENDOSCOPE HAVING FUNCTION OF EFFECTING ENLARGEMENT/REDUCTION PROCESSING

[75] Inventors: Katsuyuki Saito; Masahide Kanno; Masao Uehara; Masahiko Sasaki; Katsuyoshi Sasagawa; Shinji Yamashita; Akinobu Uchikubo, all of Hachioji; Jun Hasegawa, Hino, all of Japan

[73] Assignee: Olympus Optical Co., Ltd., Tokyo, Japan

[21] Appl. No.: 265,727

[22] Filed: Nov. 1, 1988

[30] Foreign Application Priority Data

Jan. 7, 1988 [JP] Japan .................................. 63-1844

[51] Int. Cl.⁴ ........................... A61B 1/04; H04N 7/18
[52] U.S. Cl. ....................................... 358/98; 358/166
[58] Field of Search ................. 358/98, 140, 180, 187, 358/166, 22

[56] References Cited

U.S. PATENT DOCUMENTS 4,654,711  3/1987  Mikado ................................ 358/180

FOREIGN PATENT DOCUMENTS

61-94644  5/1986  Japan .

Primary Examiner—James J. Groody
Assistant Examiner—Victor R. Kostak
Attorney, Agent, or Firm—Armstrong, Nikaido, Marmelstein, Kubovcik & Murray

[57] ABSTRACT

In an electronic endoscope apparatus of the type which uses a solid state imaging device to effect photoelectric conversion of an optical image, the image signal read from the solid state imaging device is subjected to signal processing for changing image size so as to effect enlargement/reduction of an image to be displayed on a monitor, and then the outline of the image signal is enhanced by an outline enhancement circuit. With this arrangement, it is possible to achieve natural outline enhancement.

13 Claims, 9 Drawing Sheets

FIG. 9a G.SIGNAL

FIG. 9b ENLARGED G.SIGNAL

FIG. 9c ENHANCED G.SIGNAL AFTER ENLARGEMENT

TO LIGHT SOURCE

FIG.17

ELECTRONIC ENDOSCOPE HAVING FUNCTION OF EFFECTING ENLARGEMENT/REDUCTION PROCESSING

BACKGROUND OF THE INVENTION

1. Field of the Invention

The present invention relates to an electronic endoscope apparatus which is arranged to effect outline enhancement after completion of enlargement/reduction processing.

2. Description of the Related Art

Endoscope apparatus of the electronic type which employs a solid state imaging device as an imaging means have recently been put into practice as an improvement over endoscope apparatus of the optical type which is provided with a relay optical system.

In such an electronic type of endoscope apparatus, an image can be made sharp and clear by means of outline enhancement or the like.

Figure 1:
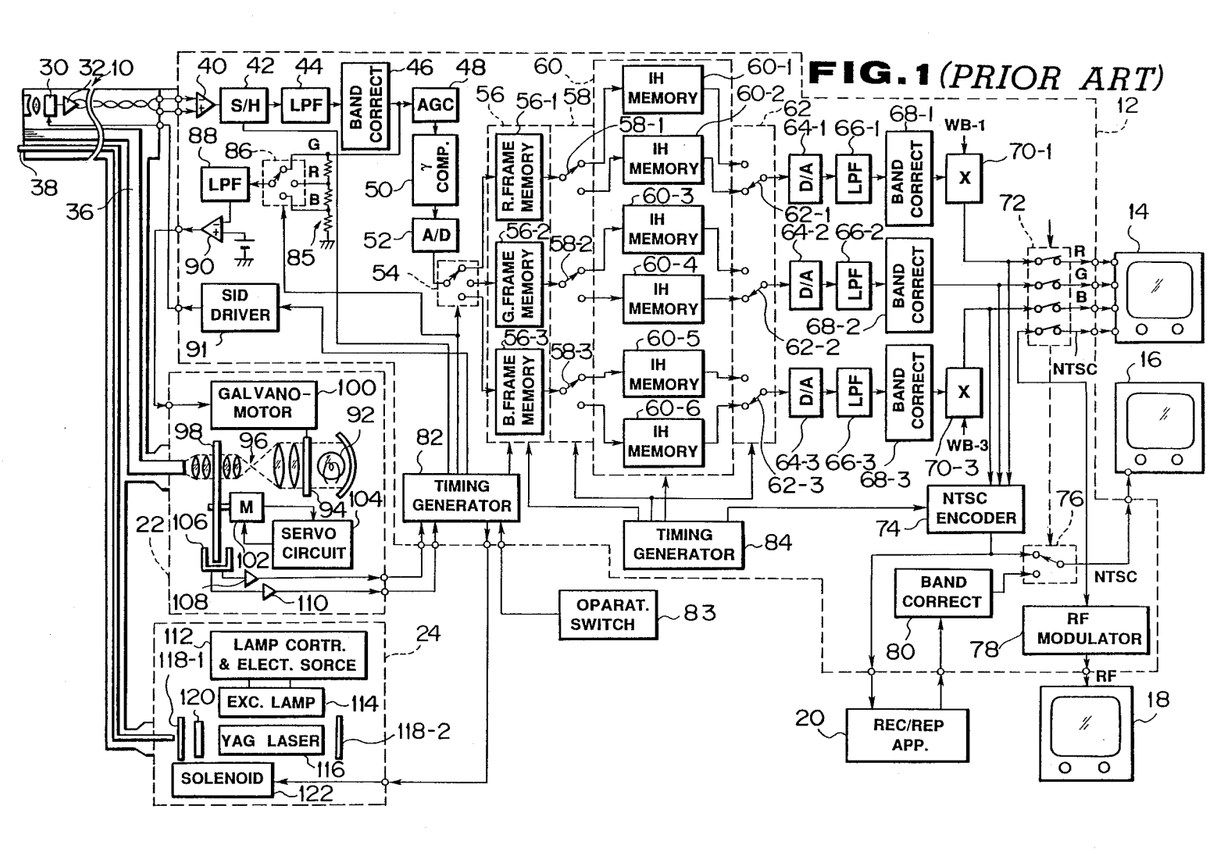
FIG. 1 is a block diagram of an example of a prior art arrangement.

For example, a prior art arrangement provided with such an outline enhancement means is proposed by the present assignee in Japanese Patent Laid-open No. 94644/1986. The construction of the example is shown in FIG. 1.

The illustrated endoscope apparatus according to the prior art comprises an endoscope body 10, a video processor 12, an RGB/NTSC monitor 14, an NTSC monitor 16, an RF monitor 18, a recording/reproducing device 20, a light source unit 22 and a laser device 24. A solid state imaging device (for example, a CCD) 30 for imaging a body organ or a body cavity is provided at the distal end of the endoscope body 10. The output of the solid state imaging device 30 is supplied as a two-phase signal to the video processor 12 through an preamplifier 32. Further, a light guide 36 and a laser probe 38 are provided in the endoscope body 10. The laser probe 38 is inserted into, for example, a forceps channel and serves to introduce a laser beam from the laser device 24 into the distal end of the endoscope body 10, irradiating an object with the laser beam. The light guide 36 is constituted by an optical fiber bundle for introducing illuminating light from the light source unit 22 into the distal end, and serves to illuminate the body organ or the body cavity. Since the distal end of the endoscope body 10 is thin, the solid state imaging device 30 consists of a light receiving portion alone and does not have a light shielding-type storing portion which functions as a shutter. A shutter mechanism is provided in the light source unit 22 as will be described later.

An image signal which has been supplied from the preamplifier 32 to the video processor 12 is first input to a CMR amplifier 40. The output signal of the CMR amplifier 40 is passed through a sample and hold circuit 42, a low-pass filter 44, a band correcting circuit 46, an AGC circuit 48, a compensation circuit 50, an A/D converter 52 and a selector 54, in that order, and is supplied to a frame memory section 56. The frame memory section 56 is constituted by three frame memories 56-1, 56-2 and 56-3 for storing R, G and B images, respectively. The selector 54 has three output terminals which are connected to the R, G and B frame memories 56-1, 56-2 and 56-3, respectively.

The outputs of the frame memory section 56 are supplied to a 1H memory section 60 through a selector section 88. The 1H memory section 60 is divided into two parts for each color component. Each of the three R, G and B color components are written into the two parts of the corresponding 1H memory in an alternately switched manner every horizontal scanning period by the operation of the selector section 58. More specifically, the outputs of the frame memories 56-1, 56-2, and 56-3 are supplied to selectors 58-1, 58-2 and 58-3, respectively. Each of the selectors 58-1, 58-2 and 58-3 has two output terminals. The output of the selector 58-1 is connected to a 1H memory 60-1 or 60-2, the output of the selector 58-2 to a 1H memory 60-3 or 60-4, and the output of the selector 58-3 to a 1H memory 60-5 or 60-6. The output of the 1H memory 60-1 or 60-2 is connected to a D/A converter 64-1 through a selector 62-1, the output of the 1H memory 60-3 or 60-4 to a D/A converter 64-2 through a selector 62-2, and the output of the 1H memory 60-5 or 60-6 to a D/A converter 64-3 through a selector 62-3. The outputs of the D/A converters 64-1, 64-2 and 64-3 are supplied to band correcting circuits 68-1, 68-2 and 68-3 through low-pass filters 66-1, 66-2 and 66-3. The outputs of the band correcting circuits 68-1 and 68-3 are supplied to multipliers 70-1 and 70-3 and multiplied by white balance adjustment signals WB-1 and WB-3 so that the respective white balances are adjusted. The outputs of the multiplier 70-1, the band correcting circuit 68-2 and the multiplier 70-3 are supplied to the R, G and B input terminals of the RGB/NTSC monitor 14, respectively.

Simultaneously, the outputs of the multiplier 70-1, the band correcting circuit 68-2 and the multiplier 70-3 are supplied to an NTSC encoder 74. The output of the NTSC encoder 74 is supplied to both a first input terminal of a selector 76 and the input terminal of the recording/reproducing device 20. The reproduced signal of the recording/reproducing apparatus 20 is supplied to a second input terminal of the selector 76 through a band correcting circuit 80. The NTSC signal output from the selector 76 is supplied through a switch 72 to the NTSC input terminal of the RGB/NTSC monitor 14, directly to the NTSC input terminal of the NTSC monitor 16, and to the RF monitor 18 through an RF modulator 78.

The output of the band correcting circuit 46 is supplied not only to the AGC circuit 48 but also to a voltage divider 85. The voltage divider 85 outputs a reference signal for each R, G and B image during automatic light control. The magnitudes of the respective reference signals become small in the order of G, R and B. This is because the magnitudes of the chrominance components of the respective G, R and B image signals become small in that order. Each voltage dividing point of the voltage divider 85 is connected to a corresponding input terminal of the selector 86, and the output signal of the selector 86 is supplied as an automatic light control signal to the light source unit 22 through a low-pass filter 88 and a comparator/amplifier 90.

The video processor 12 further includes an SID driver 91 for generating clock pulses used to drive the solid state imaging device 30. Each circuit in the video processor 14 is timing-controlled by a timing generator 82 or 84. The timing generator 82 receives the signal output from an operating switch 83 provided for controlling irradiation with a laser beam. The outputs of the timing generator 82 are supplied to the sample and hold circuit 42, the selector 54, the frame memory section 56, the selector 86 and the SID driver 91. The outputs of the timing generator 84 are supplied to the frame memory 56, the selector section 58, the 1H memory section 60, the selector section 62 and the NTSC encoder 74.

The rate of writing to the frame memory section 56 differs from the rate of reading from the frame memory section 56, and writing to the frame memory section 56 is controlled by the timing generator 82 while reading from the frame memory section 56 is controlled by the timing generator 84. The selectors 54 and 86 are controlled in synchronization with each other so that, for example, when either of them selects R, the other also selects R. The selector sections 58 and 62 are controlled so that they select mutually different 1H memories.

The light source unit 22 has a lamp 92 for emitting illuminating light to be incident upon the light guide 36. The illuminating light emitted from the lamp 92 is incident upon the light guide 36 through an iris plate 94, an optical system 96 and a rotary filter device 98. The iris plate 94 is constituted by a plate of predetermined thickness and having a plurality of through-holes. The iris plate 94 is rotated by a galvano motor 100 to change an angle with respect to the optical axis of the illuminating light, thereby adjusting the quantity of passing light by using the thickness of the through-holes. The galvano motor 100 is driven by automatic light control signals supplied from the comparator/amplifier 90. As described above, since the magnitudes of the automatic light control signals of the respective image signals become smaller in the order of G, R and B, the amount of reduction becomes smaller in the order of G, R and B and, therefore, the levels of the chrominance signals of the respective color components become uniform. The rotary filter device 98 has a shutter function and the function of coloring illuminating light in R, G and B. The rotary filter 98 is constituted by a disk in which R, G and B color filters are non-continuously arranged around the circumference of a common circle. The non-continuous portions between adjacent color filters serve as a shutter for shielding light to be supplied to the solid state imaging device 30 so as to read signals from the solid state imaging device 30. Holes are formed outside the trailing edges of the respective color filters in the direction of rotation of the rotary filter device 98, and a start pulse generating through-hole is formed outside the through-hole which is located outside the hole adjacent to the trailing edge of the R filter.

The rotary filter device 98 is rotated by a step motor 102. The step motor 102 rotates at a fixed speed under the control of a servo circuit 104. A light detector 106 is disposed in the vicinity of the edge of the rotary filter device 98. The light detector 106 consists of a light emitting diode and a light sensor, and receives the light passing through the through-hole, generating a read pulse and a start pulse.

The start pulse and read pulse output from the light detector 106 are supplied to the timing generator 82 in the video processor 12 through amplifiers 108 and 110, respectively.

The laser device 24 has a YAG laser 116 interposed between resonant mirrors 118-1 and 118-2, and the YAG laser 116 is excited by an excitation lamp 114 controlled by a lamp controlling circuit & electrical power source 112. The optical path between the YAG laser 116 and the resonant mirror 118-1 is selectively closed and opened by a shutter plate 120 connected to a solenoid 122. Thus, the laser beam of the YAG laser 116 is made incident upon the laser probe 38 in a pulsed manner. On-off action of the solenoid 122 is controlled by the timing generator 82 in the video processor 12.

In the above-described related art, the band correcting circuit 46 for effecting vertical outline enhancement is provided on the front side of the memory function (or memory section) which serves to effect simultaneous conversion of the R, G and B video signals which are sequentially read from the solid state imaging device 30, and the band correcting circuits 68-1, 68-2 and 68-3 for effecting horizontal outline enhancement are provided on the rear side of the same memory function.

The prior art example having the above-described arrangement and construction encounters the following problem if image enlargement functions in the horizontal and vertical directions are provided in the memory section. Even if outline enhancement is effected on a 1H basis in the band correcting circuit 46 provided for the purpose of vertical outline enhancement, the amount of enhancement applied to an arbitrary 1H scanning line may be decreased or a 1H horizontal scanning line which originarily requires no enhancement may undergo enhancement, owing to a vertical enlargement effect. As a result, a remarkably unnatural image may be displayed.

Figures 2, 3A, 3B, 4A:
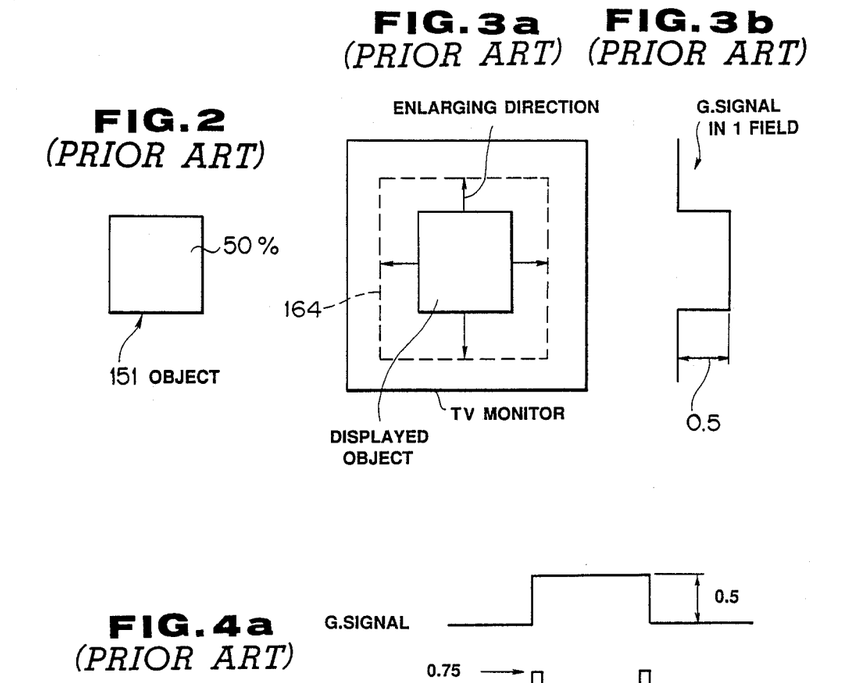
FIG. 2 is a view which serves to illustrate an example of an object.
FIGS. 3a and 3b are views which serves to illustrate an example of an image obtained by displaying the object of FIG. 2 on a TV monitor.
FIGS. 4a, 4b and 4c are waveform diagrams which serve to illustrate waveforms obtained when, in the prior art arrangement, image enlargement is effected after outline enhancement has effected on the image.

The above-described problem will be explained below with reference to FIG. 2 for complementary purposes. According to the prior art example shown in FIG. 1, when a 50% white object 151 such as that shown in FIG. 2 is imaged through the CCD 30 built in the distal end of the endoscope body 10, the output image signal of the CCD 30 is displayed on the TV monitor 14 as the image shown in FIG. 3a. The G video signal of this image for one field is shown in FIGS. 3b and 4a.

Figures 4B, 4C:
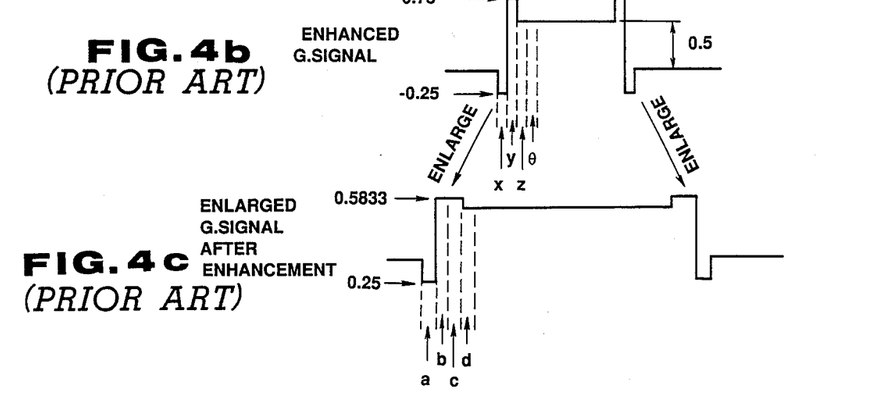

FIG. 4b shows an input video signal to the TV monitor 14 which is obtained by effecting vertical outline compensation on the signal shown in FIG. 4a on a 1H basis.

Figure 5:
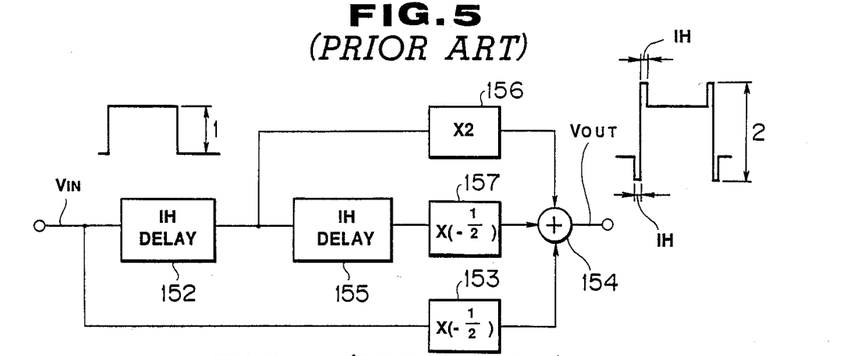
FIG. 5 is a block diagram showing a concrete example of a vertical outline enhancement circuit used in the prior art arrangement.

It is assumed that the above-described 1H-basis vertical outline compensation is effected using a construction such as that shown in FIG. 5.

Referring to FIG. 5, a part of an input signal $V_{IN}$ is delayed by one horizontal period in a 1H delay line 152, whereas the remainder of the input signal $V_{IN}$ is passed through a x $-\frac{1}{2}$ coefficient multiplier (or multiplier) 153, and is then input to an adder 154. The signal passed through the 1H delay line 152 is further passed through a 1H delay line 155, then through a x 2 coefficient multiplier 156, and then input to the adder 154. The signal passed through the 1H delay line 155 is further passed through a x $-\frac{1}{2}$ coefficient multiplier 157 and input to the adder 154. These three input signals are added in the adder 154 and an output signal $V_{OUT}$ whose edges are enhanced is provided.

Figure 6:
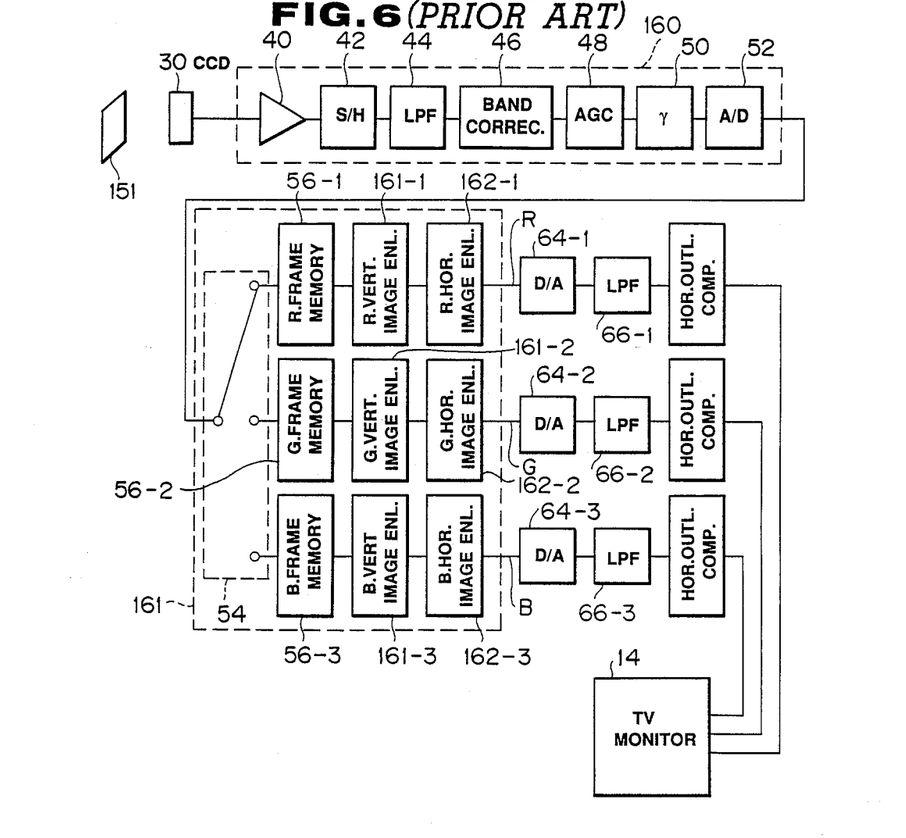
FIG. 6 is a block diagram showing in simplified block form an arrangement in which an image enlarging means is provided on the prior art arrangement shown in FIG. 1.

The primary portion in FIG. 1 is shown in a simplied form in FIG. 6, and a pre-process section is denoted by reference numeral 160. A memory section corresponding to that shown in FIG. 1 is represented at 161, and the memory section 161 includes vertical and horizontal image enlargement means 161-i and 162-i (i=1, 2 and 3). If the video signal corresponding to the central square image shown by solid lines in FIG. 3a is subjected to image enlargement and the enlarged image is displayed on the TV monitor 14, an image 164 show by dashed lines in FIG. 3a is obtained. Then, if image enlargement is effected on a video signal after vertical outline compensation (the signal shown in FIG. 4b), the resulting video signal for one field is as shown in FIG. 4c.

The image enlargement method described above is assumed to be implemented using the multiplication coefficients shown in the following table.

TABLE

| OUTPUT LINE | INPUT LINE | | | | DISPLAY FIELD |
|---|---|---|---|---|---|
| | 0 | 1 | 2 | 3 ... | |
| 0 | 12/12 | 0 | | | 1 |
| 1 | 7/12 | 5/12 | | | 2 |
| 2 | 2/12 | 10/12 | | | 1 |
| 3 | | 9/12 | 3/12 | | 2 |
| 4 | | 4/12 | 8/12 | | 1 |
| 5 | | | 11/12 | 1/12 | 2 |
| | | | 12 | 12 | 2 |
| 6 | | | 6/12 | 6/12 | 1 |

(n/12: multiplication coefficient)

With regard to the individual parts x, v, z, θ, ... of the video signal shown in FIG. 4b, the corresponding parts a, b, c, d, ... of the video signal which has been enlarged on the basis of the following arithmetic operations are obtained. In the following equations, the levels of the above x, y, z, θ, ... are represented by X, Y, Z, Σ, ... , respectively, while the levels of the above a, b, c, d, ... are represented by A, B, C, D, ..., respectively.

If X = −0.25, Y = 0.75, Z = 0.5 and = 0.5, the following relationships are obtained:

$$A = X \times 12/12 + Y \times 0 = -0.25$$

$$B = X \times 2/12 + Y \times 10/12 = 0.5833$$

$$C = Y \times 4/12 + Z \times 8/12 = 0.5833$$

$$D = Z \times 6/12 + Z \times 6/12 = 0.5$$

Thus, the waveform shown in FIG. 4c is obtained.

As can be seen from FIG. 4c, the amount of enhancement of the line which corresponds to the part b desired to be enhanced is decreased (from 0.75 to 0.5833), and the line corresponding to the part c which is not desired to be enhanced undergoes enhancement. The resultant image is remarkably unnatural.

Completely the same problem takes place even in an arrangement in which, although not shown, vertical and horizontal outline enhancement means are disposed on the front side of image enlarging means.

SUMMARY OF THE INVENTION

It is, therefore, an object of the present invention to provide an electronic endoscope apparatus in which, even if processing of image enlargement or image reduction is effected, an image having an unnaturally enhanced outline is not be displayed.

It is another object of the present invention to provide an electronic endoscope apparatus which is capable of providing an image which enables easy diagnosis.

To achieve the above and other objects, in accordance with the present invention, an outline enhancing means for effecting outline enhancement is provided on the rear side of an image size varying means for effecting signal processing, such as enlargement or reduction of an image, for varying the image size of an image to be displayed. With this arrangement, even if enlargement or reduction is effected, an image which has been naturally outline-enhanced can be displayed.

DESCRIPTION OF THE PREFERRED EMBODIMENTS

The preferred embodiments of the present invention will be described below in detail with reference to FIGS. 7 to 16.

Figure 7:
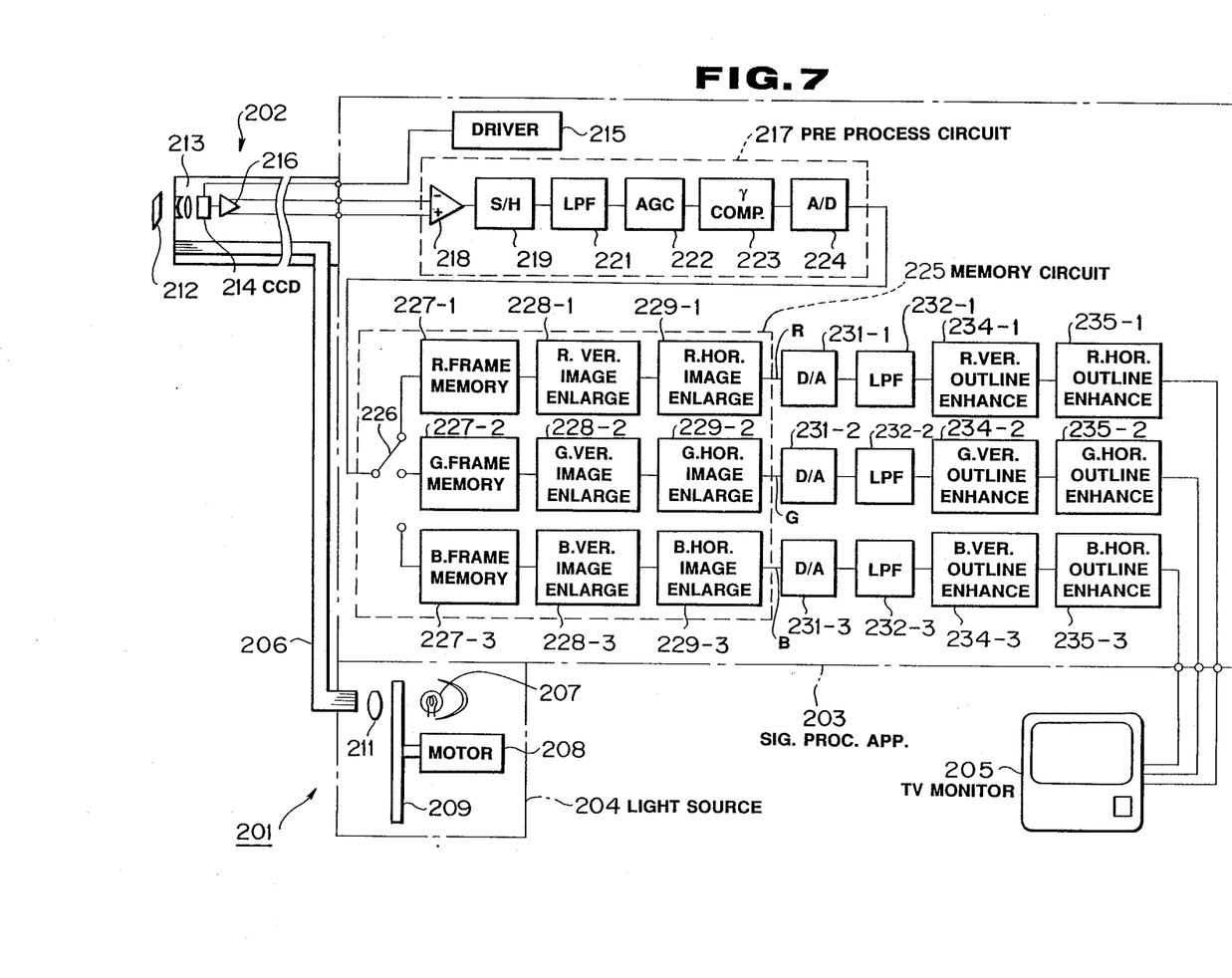
FIG. 7 is a block diagram showing an electronic endoscope apparatus according to a first embodiment of the present invention.

Referring to FIG. 7, an electronic endoscope apparatus 201 according to a first embodiment of the present invention comprises an electronic endoscope 202, a signal processing device 203 for effecting signal processing associated with the electronic endoscope 202, a light source device 204 for supplying illuminating light to the electronic endoscope 202, and a color monitor 205 for providing a color display of the video signal output from the signal processing device 203.

The electronic endoscope 202 has an elongated inserting section, and a light guide 206 is inserted through the inserting section. The light guide 206 is further inserted through a light guide cable which extends from an operating section, and the entrance end of the light guide 206 is adapted to be connected to the light source device 204.

In the light source device 204, the white light of a light source lamp 207 is passed through a rotary color filter device 209 rotated by a motor 208, converted into, for example, red, green or blue illuminating light by means of color transmitting filters which constitute the rotary color filter 209, converged by a condenser lens 211, and projected onto the entrance end surface of the light guide 206. The illuminating light incident upon the entrance end surface is transmitted through the light guide 206 and emitted toward an object 212 from the exit end surface of the light guide 206. An objective lens 213 is attached to the distal end of the inserting section and a CCD 214 is disposed in the focal plane of the objective lens 213. An image of the illuminated object 212 is focused on the CCD 21 by the objective lens 213 and thereby photoelectrically converted. In response to the drive signal output from a driver 215 in the signal processing circuit 203, the photoelectrically converted signal is read from the driver 215, amplified by an pre-amplifier 216, and transferred through a signal cable into a pre-process section 217 in the signal processing device 203. The pre-process section 217 comprises a CMR amplifier 218, a sample and hold circuit 219, an LPF circuit 221, an AGC circuit 222, a γ-compensation circuit 223, and an A/D converter 224. The output of the A/D converter 224 is input to a memory section 225.

The memory section 225 comprises a selector 226, R, G and B frame memories 227-1 227-2 and 227-3 which are sequentially selected by the selector 226; R, G and B vertical image enlargement means 228-1, 228-2 and 228-3; and R, G and B horizontal image enlargement means 229-1, 229-2 and 229-3. The above frame memories 227-1, 227-2 and 227-3 may be constituted by, for example, semiconductor memories.

Each of the outputs of the R, G and B horizontal image enlargement means 229-1, 229-2 and 229-3 is passed through a D/A converter 231-i, an LPF circuit 231-i, a vertical outline enhancement circuit 234-i and a horizontal outline enhancement circuit 235-i (where i=1, 2, 3), then input to a TV color monitor 205, and then the color image of the object is displayed on the screen of the TV color monitor 205.

The characteristics of the first embodiment described above are that memory enlarging means are provided in the memory section 205 and that the vertical outline enhancement circuits 234-i and the horizontal outline enhancement circuits 235-i are provided on the rear side of the memory enlarging means.

In the first embodiment, the construction of the vertical outline enhancement circuit 234-i may be similar to that of the one shown in FIG. 5.

Figure 8:
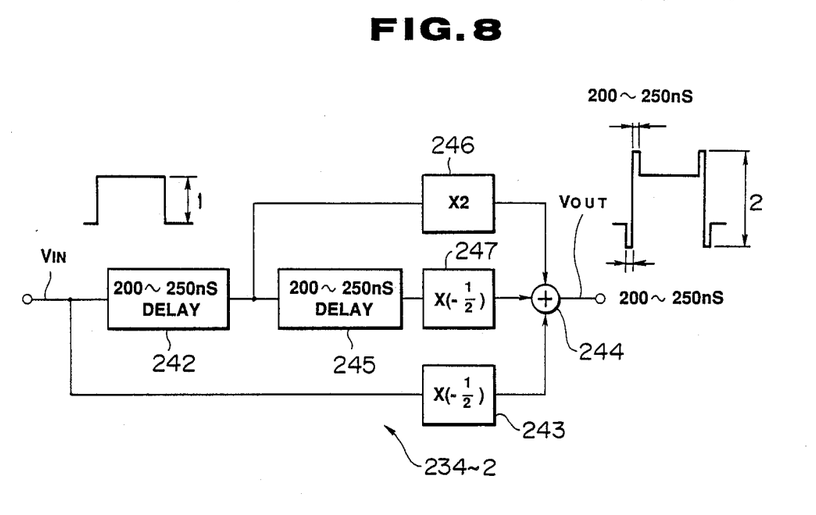
FIG. 8 is a block diagram showing a vertical outline enhancing circuit used in the first embodiment.

The construction of the horizontal outline enhancement circuit 235-i may be similar to that of the one shown in FIG. 8. Referring to FIG. 8, a part of an input signal $V_{IN}$ is delayed by a delay line 242 having the amount of delay equivalent to 200–1250 ns, whereas the remainder of the input signal $V_{IN}$ is passed through a x −½ coefficient multiplier 243 and input to a three-input adder 244. The signal passed through the delay line 242 is further passed through a delay line 245 having the amount of delay equivalent to 200–250 ns, then through a x2 coefficient multiplier 246, and then input to the adder 244. The signal passed through the delay line 245 is further passed through a x−½ coefficient multiplier 247 and input to the adder 244. These three input signals are added in the adder 244 and an output signal $V_{OUT}$ whose edges are enhanced is provided. In this horizontal outline enhancement, frequencies to be enhanced are in the neighborhood of 2–2.5 MHz which is the most sensitive frequency range in the visual characteristics of human beings.

In the above first embodiment, the image enlarging means provided in the memory section 225 may be arranged such that horizontal image enlargement is effected after vertical image enlargement, and vice verse.

In accordance with the first embodiment, the R, G and B frame sequential output signals of the CCD 214 are serially subjected to signal processing such as γ-compensation in the pre-process circuit 217 and then input to the memory section 225. The signals which have been input to the memory section 225 are temporarily stored in the frame memory 227-i and converted into simultaneous R, G and B signals. Subsequently, each of the R, G and B signals is subjected to vertical enlargement and horizontal enlargement, further passed through the D/A converter 231-i and the LPF circuit 232-i, and subjected to vertical outline enhancement at 234-i and then horizontal outline enhancement at 235-i. The R, G and B video signals whose outlines have been thus enhanced (compensated) ar displayed in color on the TV color monitor 205.

Figure 9A:
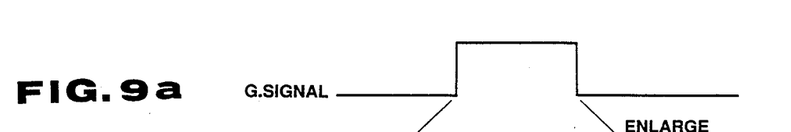
FIGS. 9a to 9c are waveform diagrams which serve to illustrate the operation of the first embodiment.
Figure 9B:
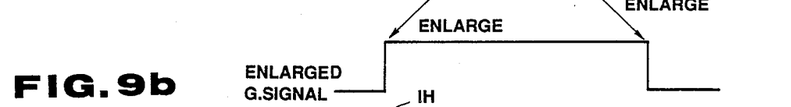

The one-field G signal obtained when the subject 151 has been imaged is shown in FIG. 3a. FIG. 9a shows a one-field G signal obtained by imaging the subject 212 identical to the subject 151 by the first embodiment, and FIG. 9b shows the waveform of this G field which has been vertically image-enlarged by the vertical image enlargement means 228-2.

Figure 9C:
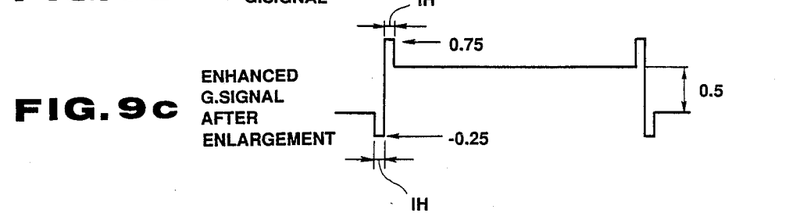

When the waveform after the above-described vertical image enlargement is further enlarged by the vertical outline enlargement circuit 234-2 having a construction identical to that shown in FIG. 5, the waveform shown in FIG. 9c is obtained.

More specifically, even if image enlargement is effected on such a one-field G signal, it is possible to obtain a normal-level outline-enhanced signal for each horizontal line since outline enhancement is effected onto the video signal after image enlargement.

The above explanation has been made with reference to the G signal for the purpose of illustration only and, since R and B signals are processed in the same manner as that used for the G signal, the descriptions thereof are omitted.

In the first embodiment, the above description of the feature of vertical outline enhancement applies to horizontal outline enhancement and, therefore, a distinct image can be displayed on the TV monitor 205 by enhancing frequencies near 2–2.5 MHz of a horizontally image-enhanced video signal which is the most sensitive frequency range in the visual characteristics of human beings.

As described above, in the first embodiment, since the vertical and horizontal outline enhancement circuits 234-i and 235-i are respectively provided on the rear sides of the image enlarging means 228-i and 229-i, natural outline enhancement can be achieved.

In addition, if, for example, the affected part in the image displayed on the monitor screen is enlarged for the purpose of diagnosis, the outline of the affected part can be naturally enhanced together with the enlargement of the part. Accordingly, it is possible to make a proper diagnosis.

Figure 10:
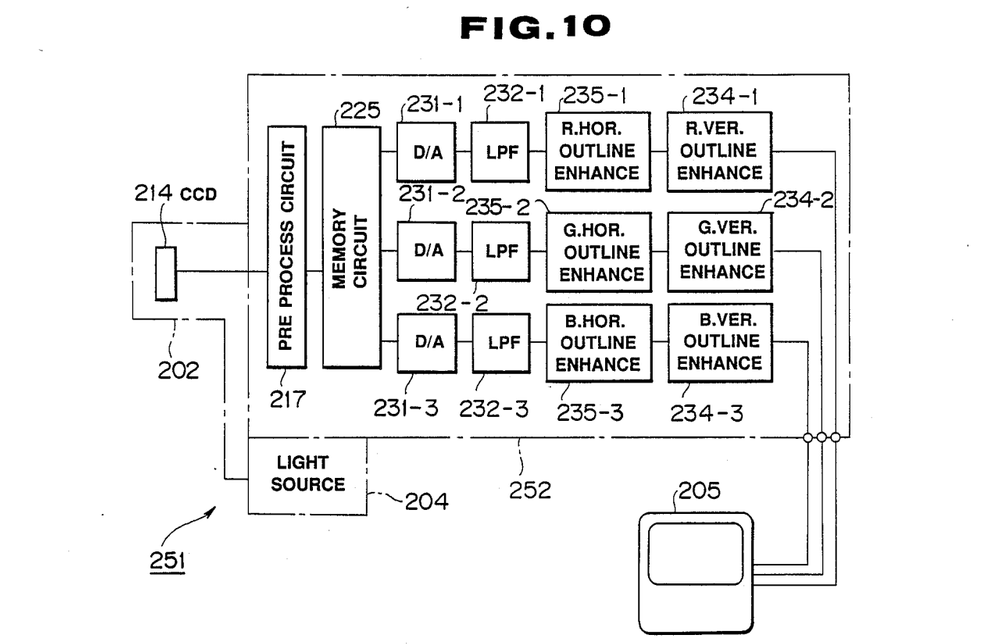
FIG. 10 is a block diagram diagrammatically showing the construction of the second embodiment.

FIG. 10 shows in block form the construction of an electronic endoscope apparatus 251 according to a second embodiment of the present invention.

The primary feature of the second embodiment resides in a signal processing device 252 in which the horizontal outline enhancement circuits 235-i are disposed on the front sides of the respective vertical outline enhancement circuits 234-i. The construction of the remaining portion as well as effects and advantages of the second embodiment is substantially identical to those of the corresponding portion of the first embodiment.

Figure 11:
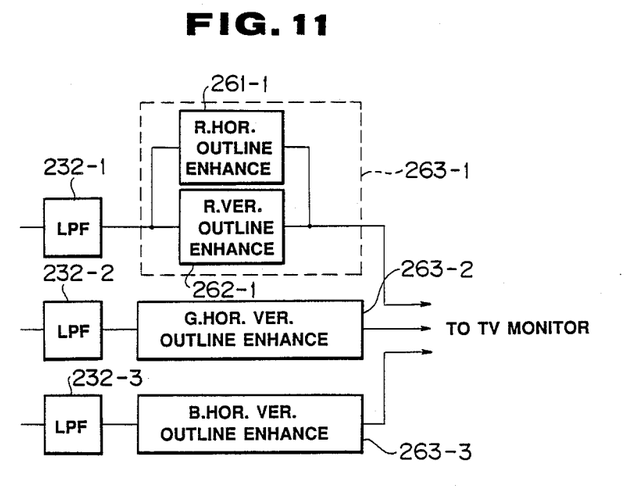
FIG. 11 is a block diagram of the essential portion of a third embodiment of the present invention.

FIG. 11 shows the essential portion of a third embodiment according to the present invention.

In the third embodiment, horizontal vertical outline enhancement circuits 263-i each of which consists of a horizontal outline enhancement circuit 261-i and a vertical outline enhancement circuit 262-i which are connected in parallel are disposed on the rear side of the LPF circuit 232-i (In FIG. 1, only 261-1 and 262-2 are shown by way of example).

Figure 12:
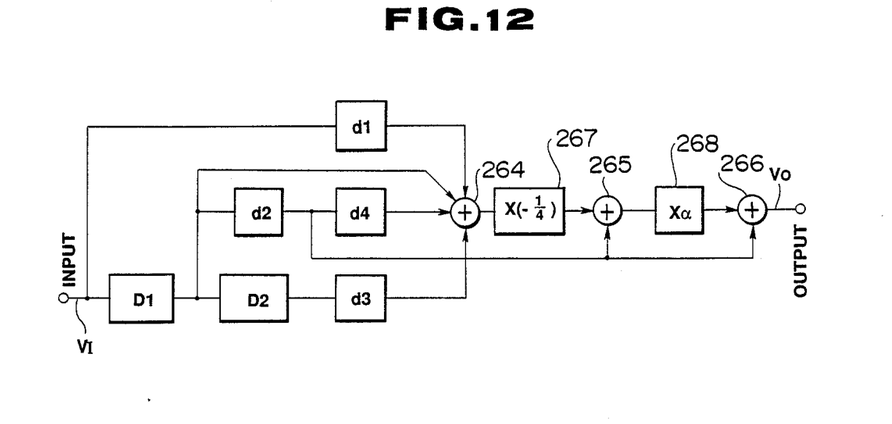
FIG. 12 is a block diagram of an outline enhancing circuit used in the third embodiment.

FIG. 12 shows the concrete construction of the horizontal . vertical outline enhancement circuit 263-1.

A part of an input signal VI is passed through a delay element d1 having the amount of delay equivalent to 200–250 ns and then input to an adder 264, while the remainder of the input signal VI is input to a delay element having the amount of delay equivalent to one horizontal period. A part of the signal passed through the delay element D1 is input to a adder 264, while the remainder of the same signal is input to each of delay elements d2 and D2. The signal passed through the delay element D2 is further passed through a delay element d3 and input to the adder 264. A part of the signal passed through the delay element d2 is input to each adder 265 and 266, while the remainder of the same signal is input to the adder 264 through a delay element d4. The sum which have been obtained by addition in the adder 264 is passed through a $x - \frac{1}{4}$ coefficient multiplier 267 and then input to the adder 265, in which the sum is added to the signal passed through the delay element d2. The result is passed through a x α coefficient multiplier 268 and added to the signal output of the delay element d2 in the coefficient multiplier 266, whereby an output signal whose outline is enhanced horizontally and vertically is provided.

The delay element di (i=1, 2, 3, 4) has the amount of delay equivalent to 200–250 ns, and the delay element Di (i–1, 2) has the amount of delay equivalent to one horizontal period.

The effects and advantages of the third embodiment are the same as those of the first embodiment.

Figure 13:
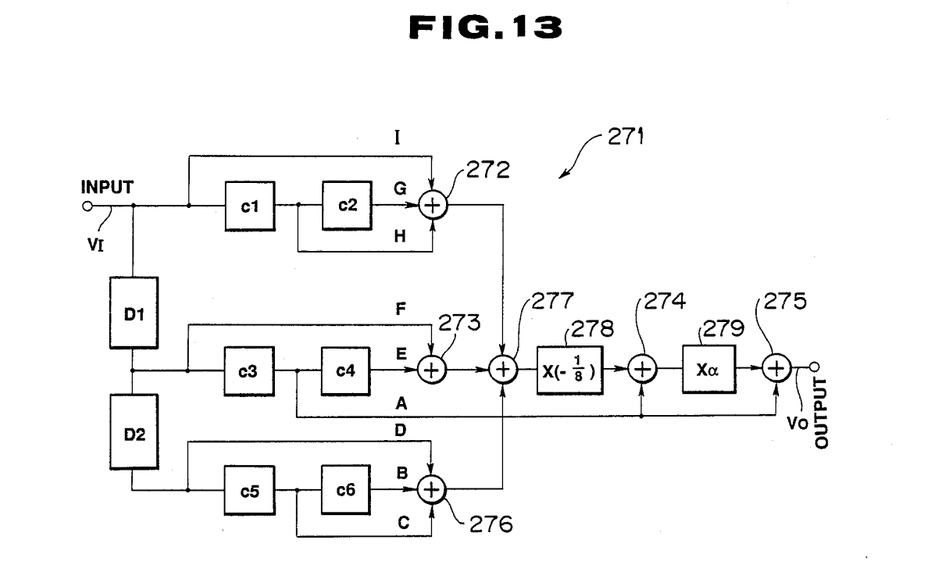
FIG. 13 is a block diagram of the outline enhancing circuit used in a fourth embodiment.

FIG. 13 shows an outline enhancing means used in a fourth embodiment according to the present invention.

The fourth embodiment will be described below with specific reference to a multiple outline enhancement circuit 271 which is capable of effecting outline enhancement in the vertical, horizontal and orthogonal directions.

Figure 14:
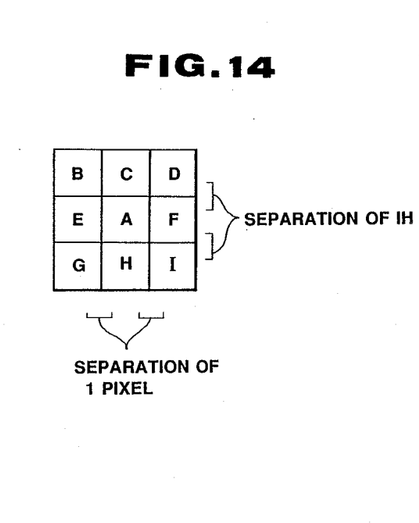
FIG. 14 is a view which serves to illustrate a pixel arrangement used in a fourth embodiment.

The multiple outline enhancement circuit 271 is arranged to effect outline enhancement on the pixels A–I of FIG. 14 in the vertical, horizontal and orthogonal directions.

As shown in FIG. 13, a part of an input signal VI is input to an adder 272, while another part of the input signal VI is passed through a delay element c1 having the amount of delay equivalent to one pixel and then input to the adder 272. The signal passed through the delay element c1 is further passed through a delay element c2 and input to the adder 272, in which all of these signals are added.

The other part of the input signal VI is passed through a delay element D1 having the amount of delay equivalent to one horizontal period and then input to each of an adder 273 and a delay element D2.

A part of the signal passed through the delay element D1 is passed through a delay element c3 and then input to an adder 274, an adder 275 and a delay element c4. The signal passed through the delay element c4 is input to an adder 273, in which it is added to the signal supplied from the delay element D1 directly to the adder 273. A part of the signal passed through the delay element D2 is input to an adder 276, while the remainder of the same signal is input to a delay element c5. A part of the signal passed through the delay element c5 is supplied directly to an adder 276, while the remainder of the same signal is passed through a delay element c6 and input to an adder 276. These two parts are added in the adder 276. The signals obtained by addition in the respective adders 272, 273 and 276 are added in the subsequent adder 277. Subsequently, the result obtained in the subsequent adder 277 is passed through a $x - \frac{1}{8}$ coefficient multiplier 278, then the adder 274, and then a x coefficient multiplier 279. In the adder 275, the result obtained in the adder 279 is added to the signal passed through the delay element c3 and thus an output signal $V_O$ which has been outline-enhanced is provided.

In FIG. 13, the delay elements c1 to c6 are of the type having the amount of delay equivalent to one pixel, and the delay elements D1 and D2 are of the type having the amount of delay equivalent to on horizontal period.

In FIG. 14, the multiple outline enhancement is effected at timings according to the arrangement of the pixels as shown by A to I.

Each of the above-described embodiments is applied to an electronic endoscope apparatus of the frame sequential system. However, the present invention can be applied to an electronic endoscope of the mosaic-filter type in which a color mosaic filter is disposed ahead of the imaging surface of a CCD.

Figure 15:
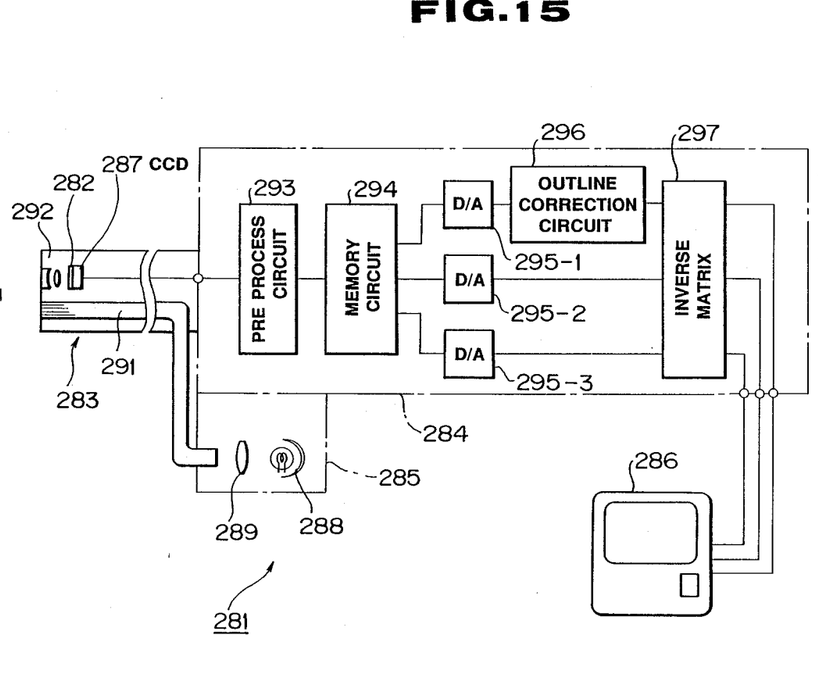
FIG. 15 is a block diagram of a fifth embodiment of the present invention.

FIG. 15 diagrammatically shows the mosaic-filter type of electronic endoscope apparatus according to a fifth embodiment of the present invention.

An electronic endoscope apparatus 281 according to the fifth embodiment comprises an electronic scope 283 having a mosaic filter 282, a signal processing device 284 for effecting signal processing associated with the electronic scope 283, a light source device 285 for supplying white light to the electronic scope 283, and a TV color monitor 286 for providing a display of the video signal output from the signal processing device 284.

In the electronic scope 283, a mosaic filter 282 is disposed on the imaging surface of a CCD 287.

The light source apparatus 285 is arranged such that the white light of a light source lamp 288 is converged by a condenser lens 289 and projected onto the entrance end surface of a light guide 291. An image of the illuminated object is focused on the CCD 287 by an objective lens 292. At this time, the image focused on the CCD 287 is color-separated by the mosaic filter 282 disposed ahead of the imaging surface of the CCD 287. The output of the CCD 287 is passed through a pre-process section 293 and input to a memory section 294. The memory section 294 includes vertical and horizontal image enlarging means and the input signal from the pre-process section 293 is electrically color-separated in the memory section 294. The memory section 294 outputs a luminance signal Y and color-difference signals R-Y and B-Y, and these signals are converted into analog form by corresponding D/A converters 295-i. The luminance signal Y is outline-enhanced by an outline correction circuit 296. The outline-enhanced luminance signal Y and the color-difference signals R-Y and B-Y are input to an inverse matrix circuit 297, in which they are converted into R, G and B signals. The R, G and B signals are displayed in color on a TV color monitor 286.

In the above-described electronic endoscope apparatus 281, the outline correction circuit 296 is disposed for handling the image-enlarged Y video signal. By performing inverse matrix operations as to the Y outline-enhanced signal and R-Y and B-Y signals which have been likewise image-enlarged, it is possible to easily produce outline-enhanced R, G and B signals and then provide a color display.

A concrete outline enhancement in the outline correction section 296 is realized by the above-described method (vertical-horizontal outline enhancement, horizontal-vertical outline enhancement, parallel outline enhancement in both the vertical and horizontal directions, or the multiple outline enhancement).

Figure 16:
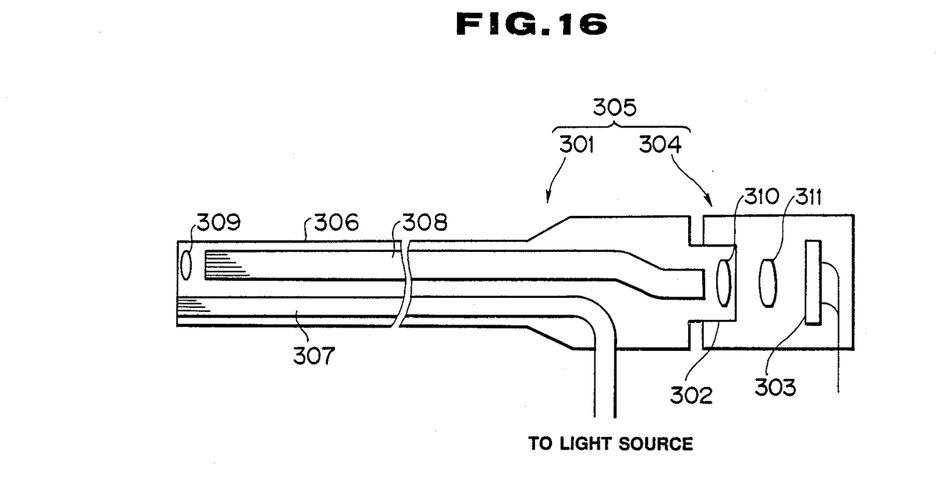
FIG. 16 is a schematic view of a fiber scope equipped with a TV camera which can be used with the first embodiment of the present invention.

The present invention is not limited to electronic endoscope apparatus of the type in which a CCD is disposed at the distal end of the inserting section. For example, the invention may be applied to an electronic endoscope apparatus 305 of the external camera attachment type in which a TV camera 304 having a built-in CCD 303 is, as shown in FIG. 16, attached to the eyepiece section 302 of an optical endoscope 301.

The optical endoscope 301 has an elongated inserting section 306 through which a light guide 307 and an image guide 308 as image transferring means are inserted.

The distal end of the inserting section 306 is provided with an objective lens 309, and the entrance end surface of the image guide 308 is disposed in the focal plane of the objective lens 309. The optical image focused on the entrance end surface is transferred to the exit end surface of the image guide 308 which is disposed adjacent to the eyepiece section 302. The optical image formed on the exit end surface is visually observed through an eyepiece lens 310 disposed in opposition to the exit surface end.

A TV camera 304 which is detachably attached to the eyepiece section 302 is disposed such that a focusing lens 311 is opposed to the eyepiece lens 310. The optical image transferred to the exit end surface is focused on a CCD 303 through the lenses 310 and 311. The signal line connected to the CCD 303 can be connected to the signal processing device 203 used in, for example, the first embodiment. Illuminating light is provided by connecting the light guide 307 to the light source device 204.

The TV camera 304 is a camera of the frame sequential type and, if such TV camera 304 is used, the electronic endoscope apparatus 305 is used in a state wherein it is connected to a frame sequential type of signal processing apparatus (for example, 203) and a light source device (for example, 204).

Figure 17:
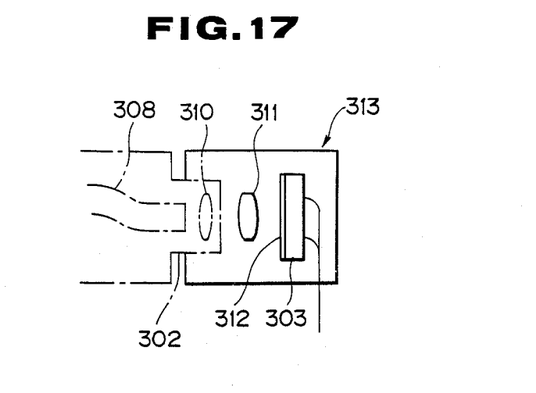
FIG. 17 is a schematic view of a TV camera of a type different from the one shown in FIG. 16.

As shown in FIG. 17, a TV camera 313 which includes a color filter 312 attached to the imaging surface of a CCD 303 may be employed. The optical endoscope 301 provided with a TV camera 313 can be used in place of the electronic endoscope shown in FIG. 15.

It is, of course, within the scope of the present invention that outline enhancing means of the type which is adapted to effect outline enhancement only in a particular direction such as the horizontal or vertical direction.

The type of outline enhancing means is not limited only to the above-described one, and another known type of outline enhancing means may of course be employed. It is to be noted that if any new outline enhancing method is proposed in the future, it may be utilized in the invention.

Each of the preferred embodiments has been described in connection with the case in which an image is enlarged, but it will be appreciated that any of the above-described embodiments ca be applied to the case in which an image is reduced. Furthermore, the present embodiments can be widely applied to arrangements of the type which is capable of image reduction and image enlargement, that is, which is capable of changing image size. Accordingly, the present invention can be applied to arrangements of the type having a zooming function.

What is claimed is:

1. An electronic endoscope apparatus comprising:
   (a) an electronic endoscope including:
      an elongated inserting portion;
      illuminating-light emitting means arranged to emit illuminating light from the distal end of said inserting section;
      an objective lens system disposed at the distal end of said inserting portion; and
      a solid state imaging device disposed in the focal plane of said objective lens system and having the function of photoelectric conversion;
   (b) a signal processing device including:
      a drive circuit for applying a drive signal to said solid state imaging device so as to read out an image signal;
      memory means for storing the image signal read from said solid state imaging device by the application of said drive signal;
      image size changing means for selectively effecting enlargement or reduction of the period of the image signal which is read from said memory means, by changing one of the frequency of a readout clock and the number of clocks; and
      outline enhancing means for effecting outline enhancement, in an arbitrary direction, of said image signal which has been passed through said image size changing means; and
   (c) display means for displaying said image signal passed through said outline enhancing means.

2. A signal processing device for use with an endoscope, which device is connected to an electronic endoscope of the type having an objective optical system disposed at the distal end of an elongated inserting section and imaging means for effecting photoelectric conversion, by means of a solid state imaging device, of an optical image provided by said objective optical system;
   memory means for storing the image signal output from said solid state imaging device;
   image size changing means for effecting time-base enlargement/reduction of the signal period of the image signal read from said memory means; and
   outline enhancing means following said image size changing means for effecting outline enhancement, at least in one direction, on said image signal passed through said image changing means.

3. A device according to claim 2, wherein said electronic endoscope is an electronic endoscope of the type in which said solid state imaging device is disposed in the focal plane of said optical system.

4. A device according to claim 2 wherein said electronic endoscope comprises an optical endoscope arranged to transfer the optical image formed by said objective optical system through an image guide; and a television camera disposed in an eyepiece section of said optical endoscope and including a solid state imaging device for effecting photoelectric conversion of said optical image transferred through said image guide.

5. A device according to claim 1 or 2, wherein said outline enhancing means is constituted by a horizontal outline enhancement circuit for effecting outline enhancement in the horizontal direction.

6. A device according to claim 1 or 2, wherein said outline enhancing means is constituted by a vertical outline enhancement circuit for effecting outline enhancement in the vertical direction.

7. A device according to claim 1 or 2, wherein said outline enhancing means is constituted by a horizontal and vertical outline enhancement circuit for effecting outline enhancement in the horizontal and vertical directions.

8. A device according to claim 1 or 2, wherein said outline enhancing means is an outline enhancement circuit for effecting outline enhancement in the vertical, horizontal and orthogonal directions.

9. A device according to claim 7, wherein said horizontal and vertical outline enhancement circuit is a circuit in which a horizontal outline enhancement circuit for effecting horizontal outline enhancement and a vertical outline enhancement circuit for effecting vertical outline enhancement are connected in parallel with each other.

10. A device according to claim 7, wherein said horizontal and vertical outline enhancement circuit is a circuit in which a horizontal outline enhancement circuit for effecting horizontal outline enhancement and a vertical outline enhancement circuit for effecting vertical outline enhancement are connected in series with each other.

11. A device according to claim 1 or 2, wherein said solid state imaging device has a color separating filter disposed ahead of its imaging surface.

12. A device according to claim 1 or 2, wherein said image size changing means is an image enlarging means for enlarging the time scale of an image signal in at least one of the horizontal and vertical directions.

13. A device according to claim 1 or 2, wherein said memory means is constituted by a frame memory having a memory capacity equivalent to at least one frame.

* * * * *